United States Patent
Clark

[19]

[11] Patent Number: 5,911,200
[45] Date of Patent: Jun. 15, 1999

[54] BACK CLOSURE ANIMAL HARNESS

[76] Inventor: Patricia G. Clark, 232 Blue Hills Dr., Nashville, Tenn. 37214

[21] Appl. No.: 09/049,899

[22] Filed: Mar. 28, 1998

[51] Int. Cl.⁶ .................................................. A01K 27/00
[52] U.S. Cl. ............................................. 119/864
[58] Field of Search .................................. 119/850, 856, 119/858, 864, 907, 725, 728, 769, 771, 792

[56] References Cited

U.S. PATENT DOCUMENTS

| | | |
|---|---|---|
| 2,555,027 | 5/1951 | Clayton . |
| 4,559,906 | 12/1985 | Smith . |
| 4,982,700 | 1/1991 | Gorden . |
| 5,247,905 | 9/1993 | Arakawa .................................. 119/863 |
| 5,370,083 | 12/1994 | Sporn . |
| 5,427,061 | 6/1995 | McCullough ........................... 119/771 |
| 5,443,637 | 8/1995 | Saleme . |

FOREIGN PATENT DOCUMENTS

| | | |
|---|---|---|
| 521358 | 5/1940 | United Kingdom . |
| 648603 | 1/1951 | United Kingdom . |
| 2195224 | 4/1988 | United Kingdom .................... 119/858 |

*Primary Examiner*—Thomas Price

[57] ABSTRACT

A harness with a quick single back closure and consisting of a chest strap traveling around the chest of an animal and attached at each end to mid-riff straps. There is a strap under the animal joined to the center of the chest strap at one end and forming a loop at the other end.

4 Claims, 4 Drawing Sheets

BACK CLOSURE ANIMAL HARNESS

BACKGROUND

1. Field of Invention

This invention relates to animal harnesses, specifically those for domestic animals.

2. Description of Prior Art

Heretofore animal harnesses have usually closed on an animal's underside as in U.S. Pat. No. 4,982,700 to Gordon (1991), U.S. Pat. No. 5,370,083 to Sporn (1994), British Patent 521,358 to Osborne (1940) and British Patent 648,603 to Catlett (1951). Harnesses that close under an animal have some portion that must go over an animal's head. Animals balk at having a harness placed over their heads. It is very difficult to close a harness on the underside of an animal. Unless the animal stands on its hind legs or lies on its back the closure can't be seen.

Harnesses which fasten without going over the animals head have more than one closure as in U.S. Pat. No. 2,555,027 to Clayton (1948), U.S. Pat. No. 5,443,037 to Saleme (1995) and U.S. Pat. No. 4,559,906 to Smith (1985). Having more than one closure is time consuming.

OBJECTS AND ADVANTAGES

Accordingly, several objects and advantages of my invention are:

(a) to provide a harness that does not go over the animals head;

(b) to provide a harness that closes on the animals back;

(c) to provide a harness that causes little discomfort to the animal;

(d) to provide a harness that can be applied and removed speedily;

(e) to provide a harness with one point of closure.

Further objects and advantages will become apparent from a consideration of the ensuing description and drawings.

DRAWING FIGURES

REFERENCE NUMERALS IN DRAWINGS

Figure 1:
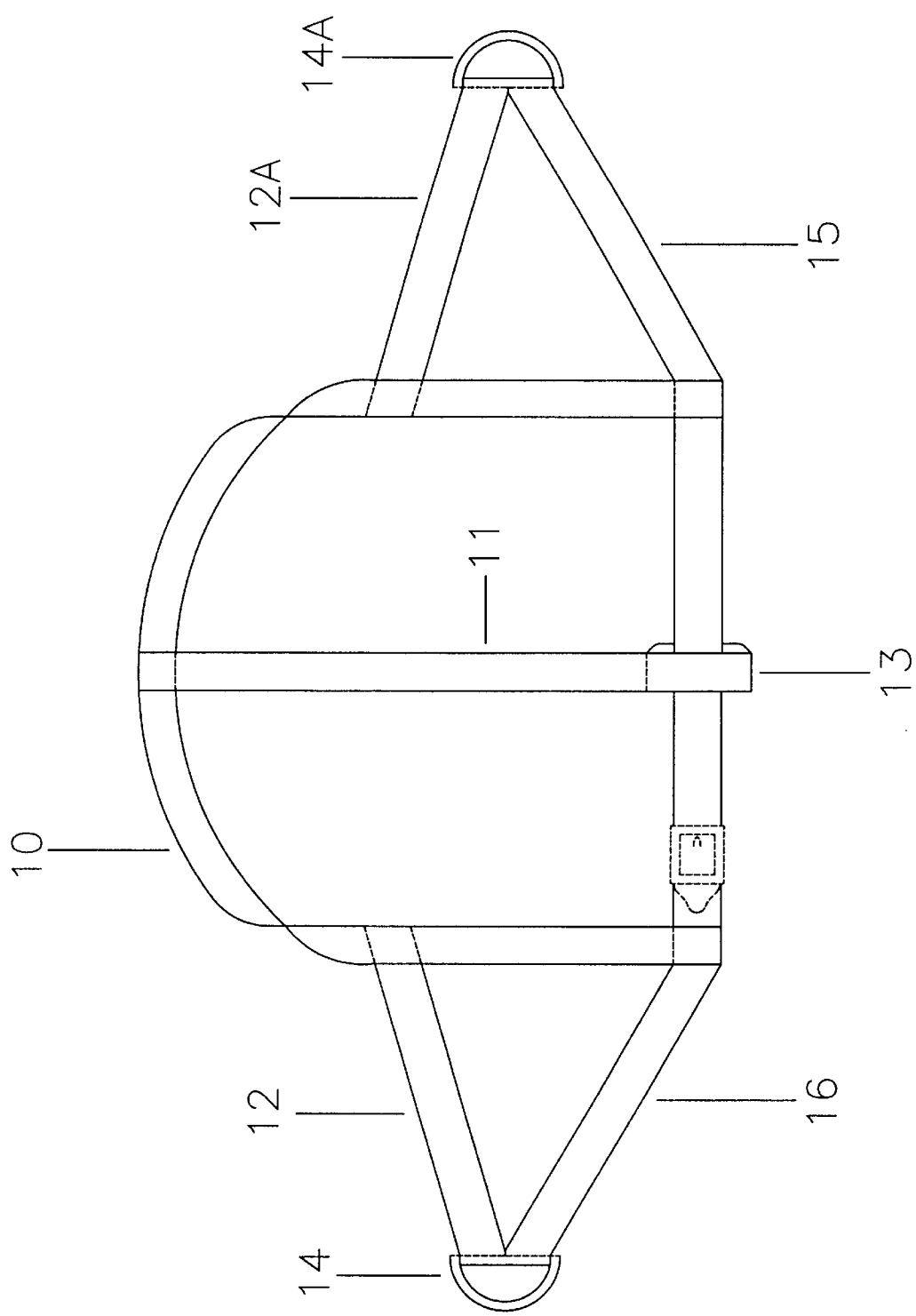
FIG. 1 is a perspective view of the harness lying flat.
Figure 2:
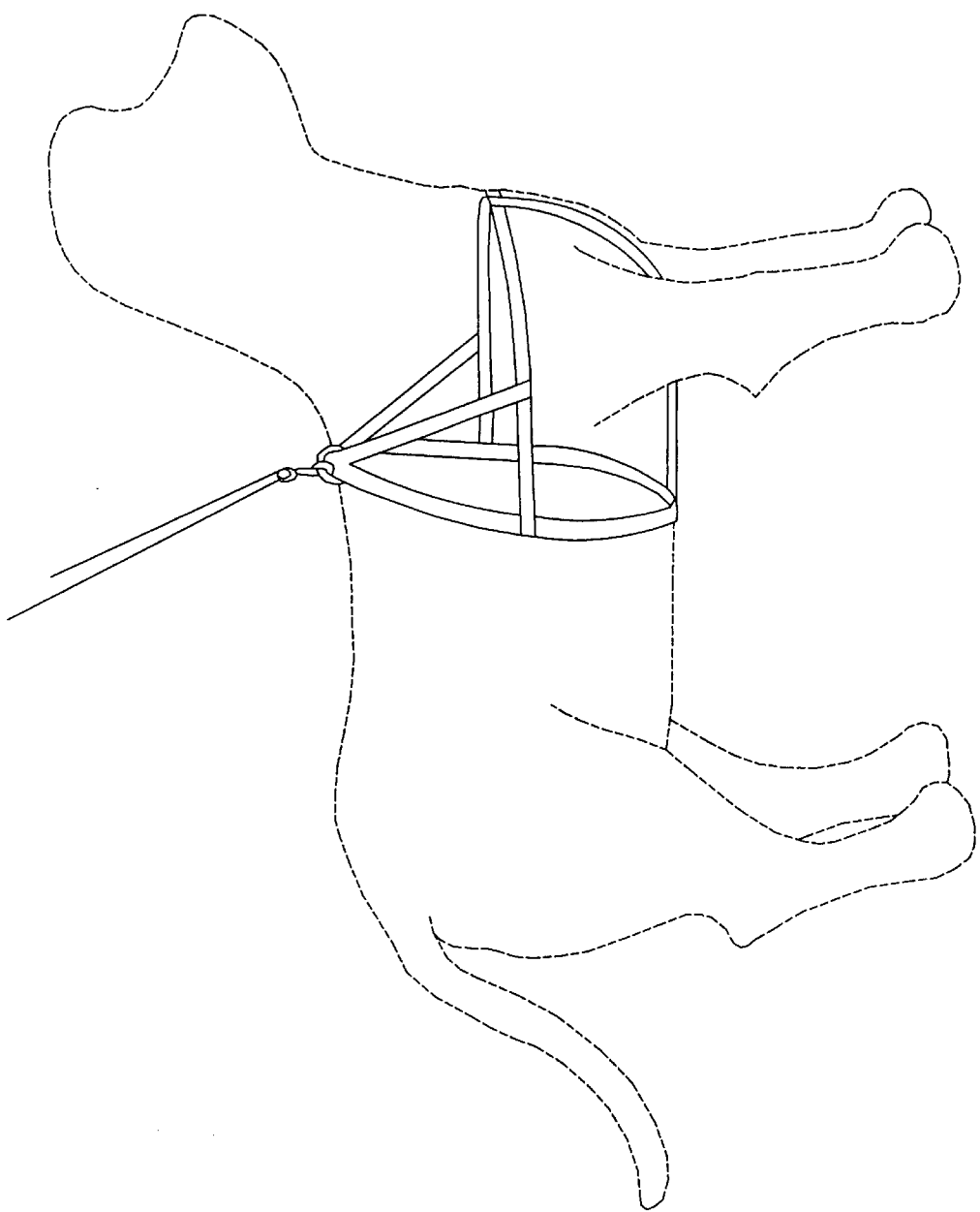
FIG. 2 is a perspective view of the harness in relation to being worn by an animal.
Figure 3:
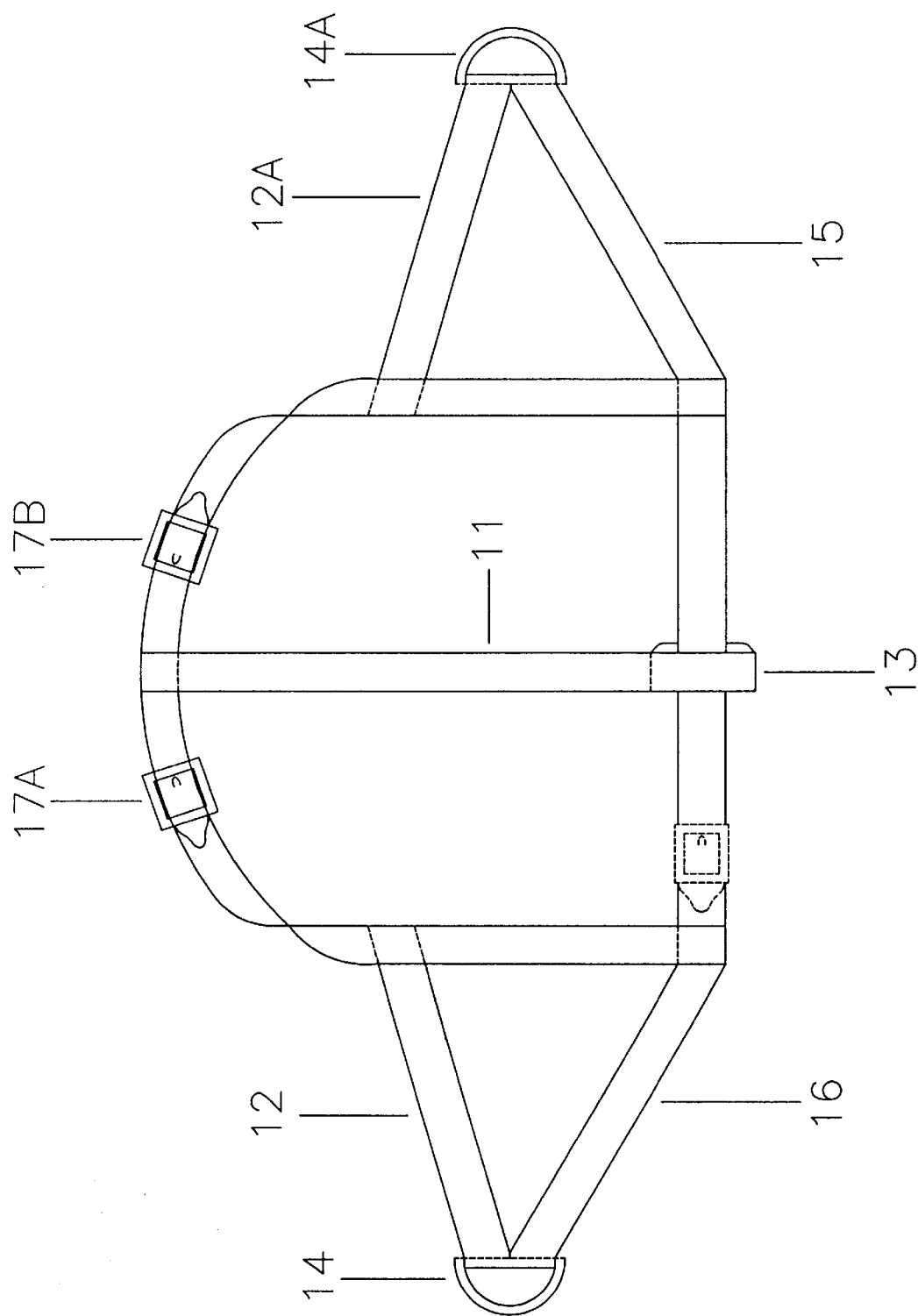
FIG. 3 is a perspective view of the harness illustrating additional adjusting means.
Figure 4:
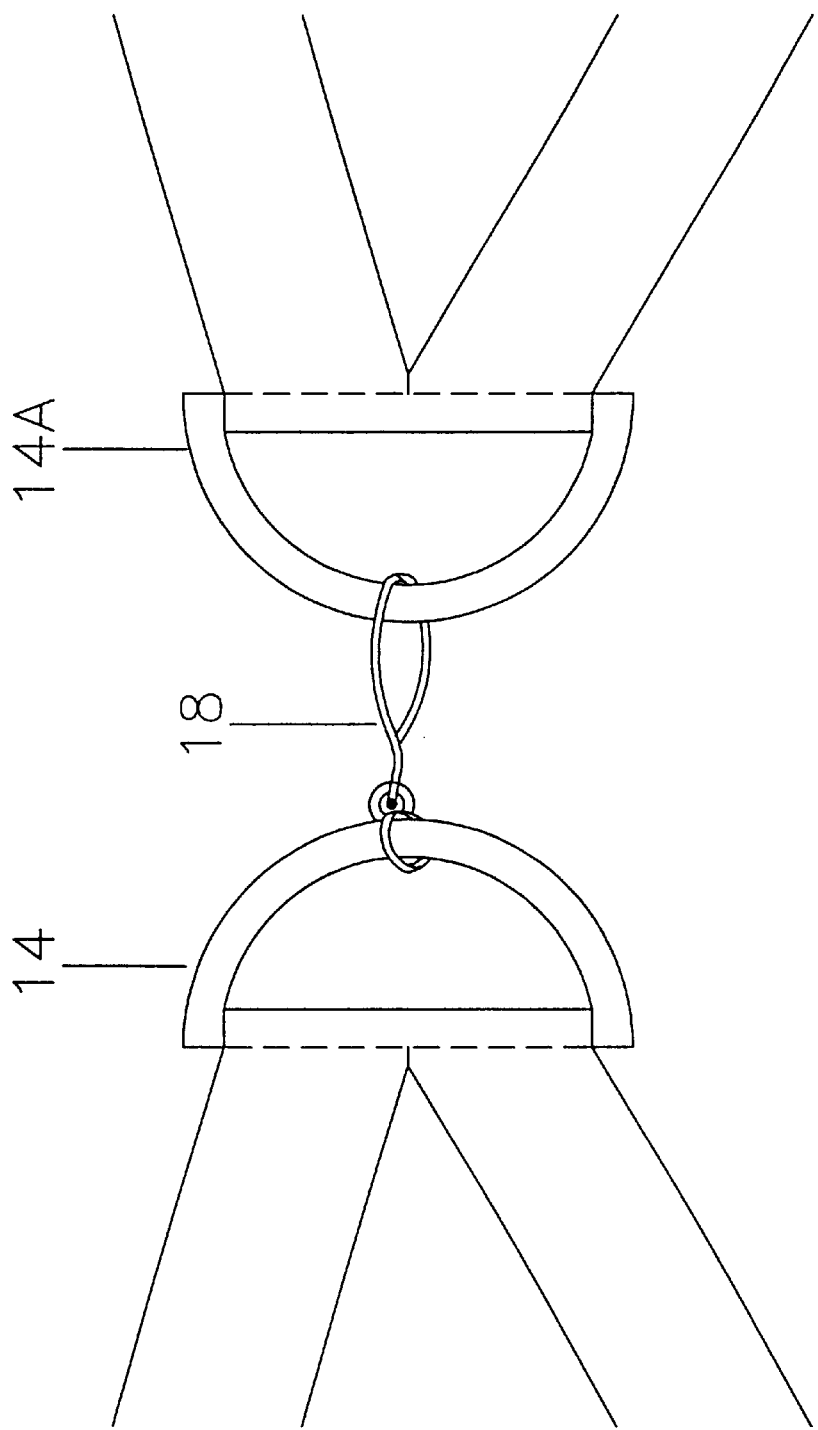
FIG. 4 is a close up of an alternative device for joining closing means.

10 - chest strap
12 and 12A - side straps
14 and 14a - closing means
16 - short mid-riff strap
18 - element for joining closing means
11 - under strap
13 - loop at end of under strap 11
15 - long mid-riff strap
17, 17A, 17B - size adjusting means Description—FIGS. 1,3,4 and 5

The harness is shown lying flat in FIG. 1. It is comprised of front strap 10, which is attached on one end to body of short mid-riff strap 16, and on the other end to body of long mid-riff strap 15. Short mid-riff strap 16 is attached on one end to closing means 14 and at the other end to size adjusting means 17. Long mid-riff strap 15 is attached on one end to closing means 14A, slips through loop 13, and at the other end is joined to short mid-riff strap 16 via size adjusting means 17. Side strap 12 is attached at one end to closing means 14 and at the other end to the side of front strap 10. Side strap 12A is attached at one end to closing means 14A and at the other end to the second side of front strap 10. Under strap 11 is attached at one end to center of front strap 10 and the other end forms loop 13. Element 18 (FIG. 4) for joining closing means is attached to closing means 14.

Operation FIG. 1,3,4,5

The manner of using the Domestic Animal Harness is to attach a leash clip to either closing means 14 or 14A. Lay the harness on a flat surface positioned as in FIG. 1. Have the animal face the harness from the perspective of FIG. 1. Place the animal's front feet one in each space formed on either side of under strap 11. With a closing means in each hand, lift both sides of the harness to the animal's back. Attach the clip of a leash to the remaining closing component 14 or 14A. Thus the leash clip secures both closing means. Element 18 for joining closing means can be used to replace the leash clip.

To remove the domestic animal harness release one closing means from the leash clip and the harness will fall from the animal.

The purpose of under strap 11 in FIG. 1 is to secure the front strap to the mid-riff strap. This prevents the animal from getting the chest strap over its head and escaping.

Conclusion, Ramifications, and Scope

Thus the reader will see that this harness attaches and releases quickly. It has only one point of closure on an animal's back The under strap by joining the chest strap and mid-riff straps provides extra security against escape. It also can be seen that the long hair of an animal doesn't hamper this harness. Furthermore this harness has the additional advantages in that it does not chafe the animal under it's front legs;

the animal isn't alarmed by a harness going over it's head;

it is lightweight and can be stored compactly;

it can be made in a variety of colors and patterns; and it can incorporate various closing means.

Although the description above contains many specifications, these should not be construed as limiting the scope of the invention but merely as providing illustrations of some of the presently preferred embodiments of this invention. For example, the chest strap could also have size adjusting means; the closing means could be of varying materials, shapes, sizes, and colors. The size adjusting means could be of varying materials, shapes, sizes, and colors. The straps could be of varying widths, lengths, colors, and materials.

Thus the scope of the invention should be determined by the appended claims and their legal equivalents, rather than by the examples given.

I claim:

1. A harness for animals comprising (a) a closing means and leash attachment point (b) a long mid-riff strap attached to said closing means on one end traversing a loop of an under strap and attached to a size adjusting means on the other end (c) a short mid-riff strap attached to said closing means on one end and said size adjusting means on the other end (d) a chest strap attached on one end to body of said long mid-riff strap and attached on the other end to body of said short mid-riff strap (e) said under strap permanently attached on one end to center of said chest strap and forming said loop on the other end (f) two side straps each attached on one end to said closing means and on the other end to each side of said chest strap (g) said size adjusting means (h) said loop of said under strap whereby said harness is closed on an animal's back with the one closure point.

2. The harness of claim 1, further including said means for adjustment on either side of center of said chest strap.

3. The harness of claim 1, further including an element for joining said closing means.

4. A harness for animals comprising (a) an under strap permanently attached at one end to center of a chest strap and forming a loop at other end (b) said chest strap attached at one end to body of long mid-riff strap and at other end to body of short mid-riff strap (c) said long mid-riff strap attached at one end to a closing means traversing said loop of said under strap and attached at other end to short mid-riff strap via size adjusting means (d) said short mid-riff strap attached at one end to said closing means and attached at other end to said size adjusting means (e) two side straps each attached at one end to said closing means and at other end to each side of said chest strap (f) said loop of said under strap (g) said size adjusting means (h) said closing means and leash attachment point whereby said harness is closed on an animal's back with one closing point.

\* \* \* \* \*